United States Patent [19]
Garrido

[11] Patent Number: 6,109,584
[45] Date of Patent: Aug. 29, 2000

[54] MANUAL LOCK FOR SEAT ADJUSTER

[75] Inventor: Pascal Garrido, Gravehurst, Canada

[73] Assignee: Dura Automotive Sytems, Rochester Hills, Mich.

[21] Appl. No.: 09/207,127

[22] Filed: Dec. 8, 1998

[51] Int. Cl.⁷ .................................................. F16M 13/00
[52] U.S. Cl. ........................................ 248/429; 297/344.1
[58] Field of Search ................................... 248/429, 424, 248/421; 297/344.1, 311

[56] References Cited

U.S. PATENT DOCUMENTS

| | | | |
|---|---|---|---|
| 3,381,927 | 5/1968 | Stamates | 248/429 |
| 4,936,535 | 6/1990 | Johansson | 297/344.1 X |
| 5,348,373 | 9/1994 | Stiennon | 297/344.1 |
| 5,775,662 | 7/1998 | Hoshihara et al. | 248/429 |
| 5,782,138 | 7/1998 | Groche | 248/429 X |
| 5,816,110 | 10/1998 | Schuler et al. | 248/429 X |

*Primary Examiner*—Ramon O. Ramirez
*Attorney, Agent, or Firm*—Robert Kelly Roth

[57] ABSTRACT

A vehicle seat assembly includes a seat bottom and a seat back supported for movement relative to the seat bottom such that seat position can be adjusted forwardly or rearwardly with respect to the vehicle. A mounting assembly mounts the seat to a vehicle structure and includes a first track, a second track supported for movement relative to the first track with the seat bottom being supported on the second track for movement with the second track, and an actuator for selectively controlling the movement of the second track with respect to the first track. A locking assembly is moveable between a locked position where the locking assembly prevents relative movement between the first and second tracks and an unlocked position where the second track is movable relative to the first track. The locking assembly includes a pair of lock pins, a lock block, and a retainer. The lock block is fixed for movement with the second track and includes apertures for slidably receiving the lock pins. The retainer is comprised of a plurality of apertures in the first track that receive distal ends of the lock pins when the locking assembly is in the locked position. The actuator is used to disengage the lock pins from the apertures to allow the second track to move relative to the first track.

15 Claims, 3 Drawing Sheets

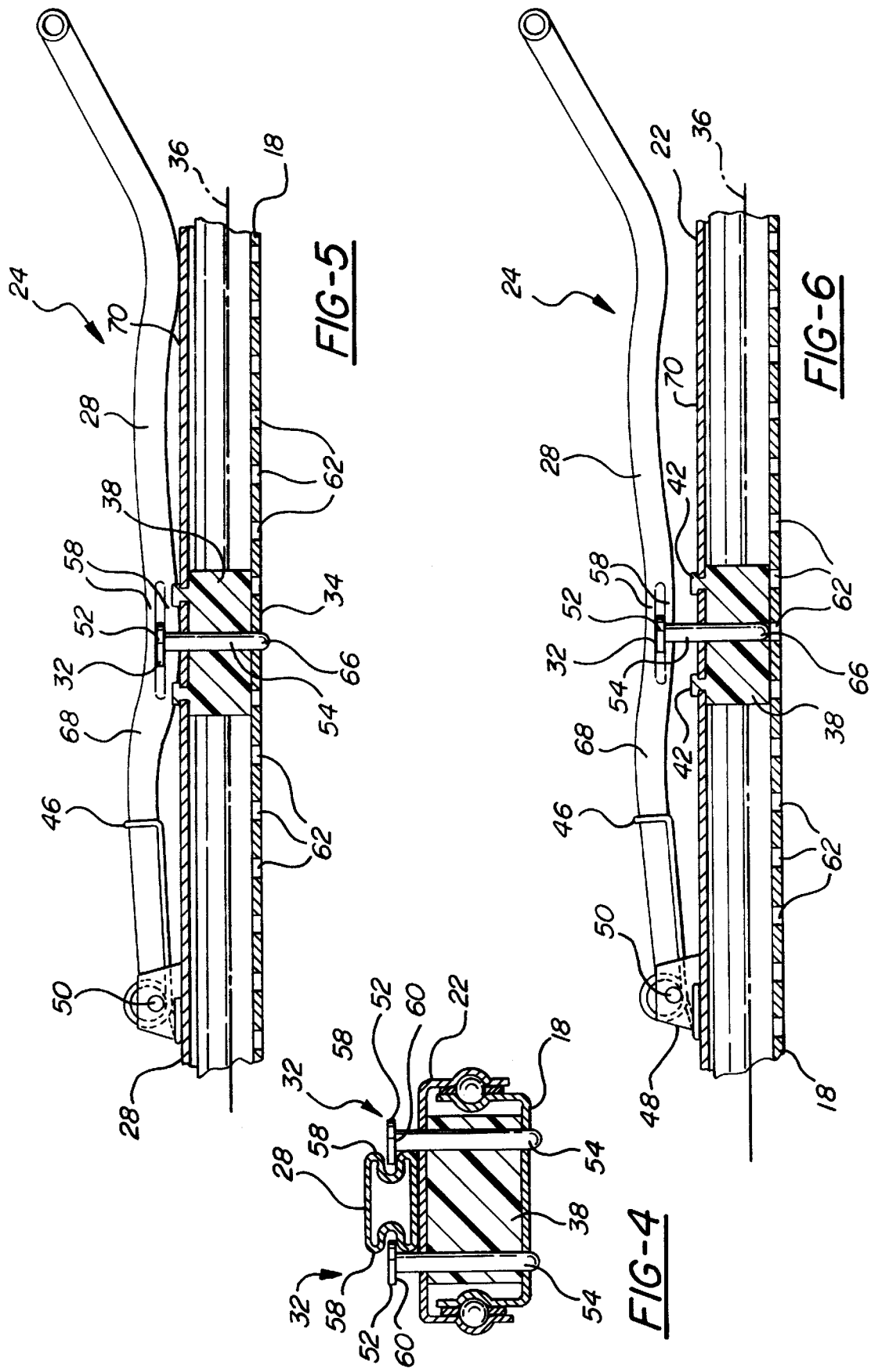

MANUAL LOCK FOR SEAT ADJUSTER

BACKGROUND OF THE INVENTION

This application relates to a locking assembly that moves between an unlocked position allowing relative movement between two seat tracks and a locked position preventing movement between the tracks, and more particularly to a locking assembly having a lock member that is moved vertically by an actuator between the locked and unlocked positions.

Seat adjusters with locking assemblies are often used in seat assemblies for controlling movement between track members. Typically a first track member is fixed to a vehicle structure, such as a floor, and a second track member is supported on the first track member for movement relative to the first track member such that the seat position can be adjusted forwardly or rearwardly with respect to the vehicle. The adjustment of the seat assembly is controlled by either a mechanical actuator, an electrical actuator, or an electro-mechanical actuator. Locking assemblies are moved between an unlocked position where the second track is allowed to move relative to the first track and a locked position where the second track is prevented from moving with respect to the first track.

Locking assemblies are in the locked position to prevent movement between the seat tracks during normal operation of the vehicle. When a seat adjustment is required, the actuator moves the locking assembly to the unlocked position and the second track is allowed to move relative to the first track. When the seat is in the desired position, the locking assembly is returned to the locked position.

Most manual seat adjusters use steel tracks in order to meet strength and fatigue requirements. The locking assembly used in this type of seat adjuster is complex and typically made of steel. If aluminum tracks are used in the seat assembly to reduce weight, a steel plate has to be added along one of the tracks in order for the seat adjuster to meet the strength and stability after endurance requirements, which is undesirable.

Thus, it is desirable to have a locking assembly that does not require a steel on steel interface between the track members and the locking assembly such that aluminum or other light weight track materials can be used while still meeting strength and stability after endurance requirements. It is also desirable to have such a locking assembly that is durable and robust yet requires few parts so that assembly cost and overall assembly weight can be reduced.

SUMMARY OF THE INVENTION

In a disclosed embodiment, a locking assembly includes a first track defining a longitudinal axis, a second track supported for linear movement relative to the first track along the longitudinal axis, at least one lock member, and a retainer. The lock member is supported on the second track for movement with the second track. The retainer retains the lock member in a locked position to prevent relative movement between the first and second tracks and can be integrally formed in the first track or can be a separate piece fixed to the first track. The lock member is moved from the locked position to an unlocked position when the lock member is selectively disengaged from the retainer by moving at least a portion of the lock member in a direction transverse to the longitudinal axis.

In the preferred embodiment, the lock member is a pair of lock pins and the retainer is comprised of a plurality of apertures longitudinally spaced along the first track. An actuator is used to apply engage a portion of the lock pins to move the pins vertically with respect to the tracks and thus, disengage the pins from the apertures to allow seat adjustment.

The subject locking assembly provides a simplified locking assembly that can be used with light weight track materials and that is durable, easily installed, easily maintained, and is inexpensive. These and other features can be understood from the following specification and drawings.

BRIEF DESCRIPTION OF THE DRAWINGS

FIG. 4 is a front cross-sectional view of a seat track with the locking assembly in the locked position.

FIG. 5 is a side cross-sectional view of the seat track with the locking assembly in the locked position.

FIG. 6 is a side cross-sectional view of the seat track with the locking assembly in the unlocked position.

DETAILED DESCRIPTION OF THE PREFERRED EMBODIMENT

Figure 1:
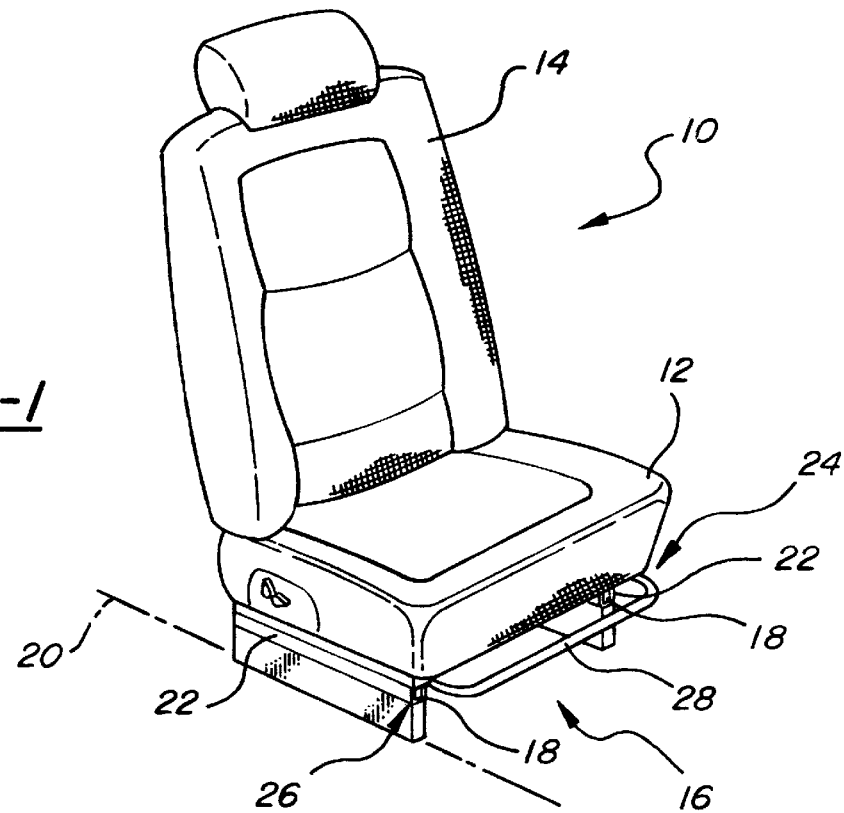
FIG. 1 is a perspective view of a seat assembly incorporating the inventive locking assembly.

A vehicle seat assembly is shown generally at 10 in FIG. 1. The seat assembly 10 includes a seat bottom 12 and a seat back 14 supported with respect to the seat bottom 12. A seat mounting assembly 16 is used to mount the seat assembly 10 to the vehicle and includes a first track 18 that is mounted to a vehicle structure 20, such as a floor, and a second track 22 that slides with respect to the lower track 18. The tracks 18, 22 define a longitudinal axis 36. The second track 22 moves with respect to the first track 18 along the longitudinal axis.

The first 18 and second 23 tracks are preferably made from aluminum to reduce the overall weight of the seat assembly 10. However, other light weight materials well known in the art could also be used to make the seat tracks 18, 22.

The seat bottom 12 is supported on the second track 22 for movement with the second track 22 for seat adjustment in a forward or rearward position. Preferably, the first track 18 is a lower track and the second track 22 is an upper track, however, it should be noted that the terms forward, rearward, upper, and lower, as used in this description, are for illustration purposes only and cannot be considered limiting.

The mounting assembly 16 includes track assemblies on an inboard side 24 and an outboard side 26 of the seat assembly 10. An actuator 28 is used for selectively controlling the movement of the second track 22 with respect to the first track 18. The actuator 28 is preferably a handle or towel bar, accessible by a seat occupant, that is operably connected to both the inboard 24 and outboard 26 track assemblies. The terms inboard and outboard are used in this description for clarity and illustration purposes only and cannot be considered limiting. The actuator 28 is moved between an unactuated position and an actuated position where the seat occupant lifts the actuator in a vertical direction to adjust the position of the seat 10.

Figure 2:
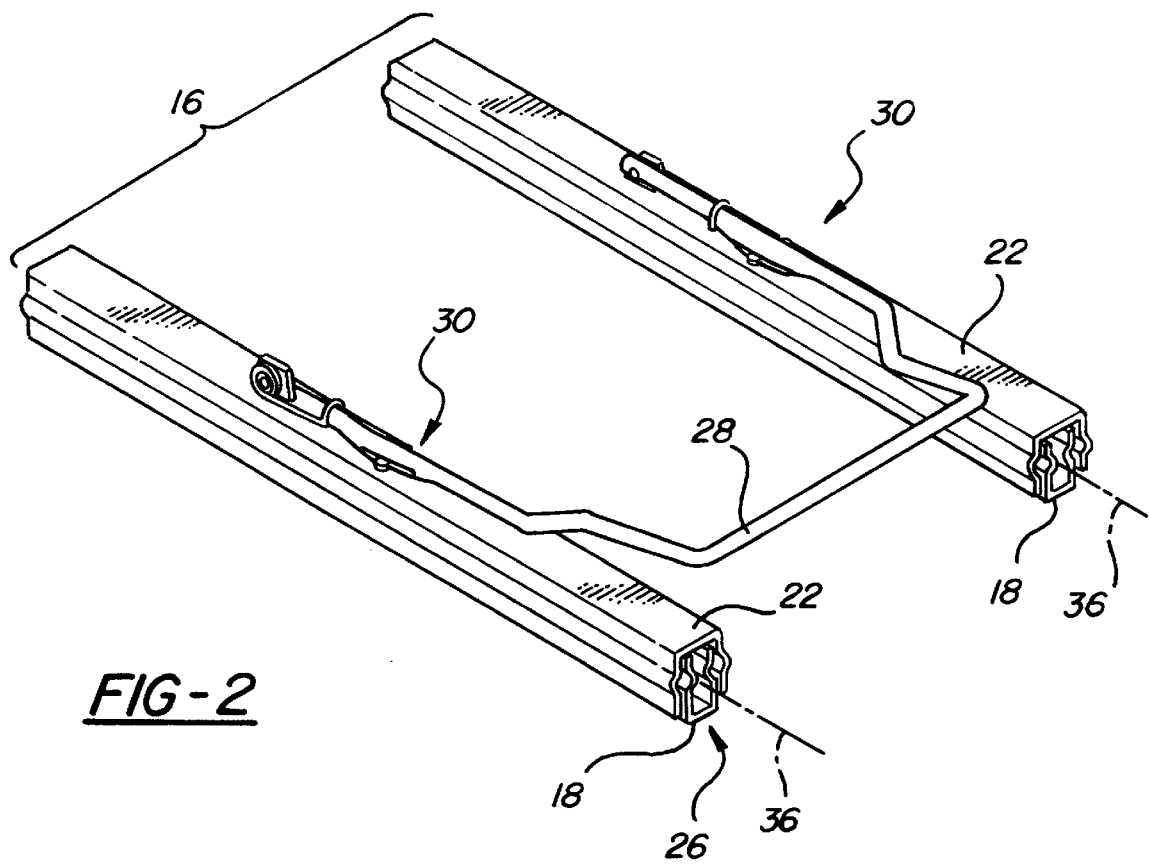
FIG. 2 is a perspective view of a seat track assembly incorporating the inventive locking assembly.

As shown in FIG. 2, the mounting assembly 16 includes a locking assembly 30 that is moveable between a locked position where the locking assembly 30 prevents relative movement between the first 18 and second 22 tracks and an unlocked position where the second track 22 is movable relative to the first track 18. The locking assembly 30 can be located on either the inboard 24 or outboard 26 track assembly, or a locking assembly 30 can be installed in both track assemblies, as shown in FIG. 2.

Figure 3:
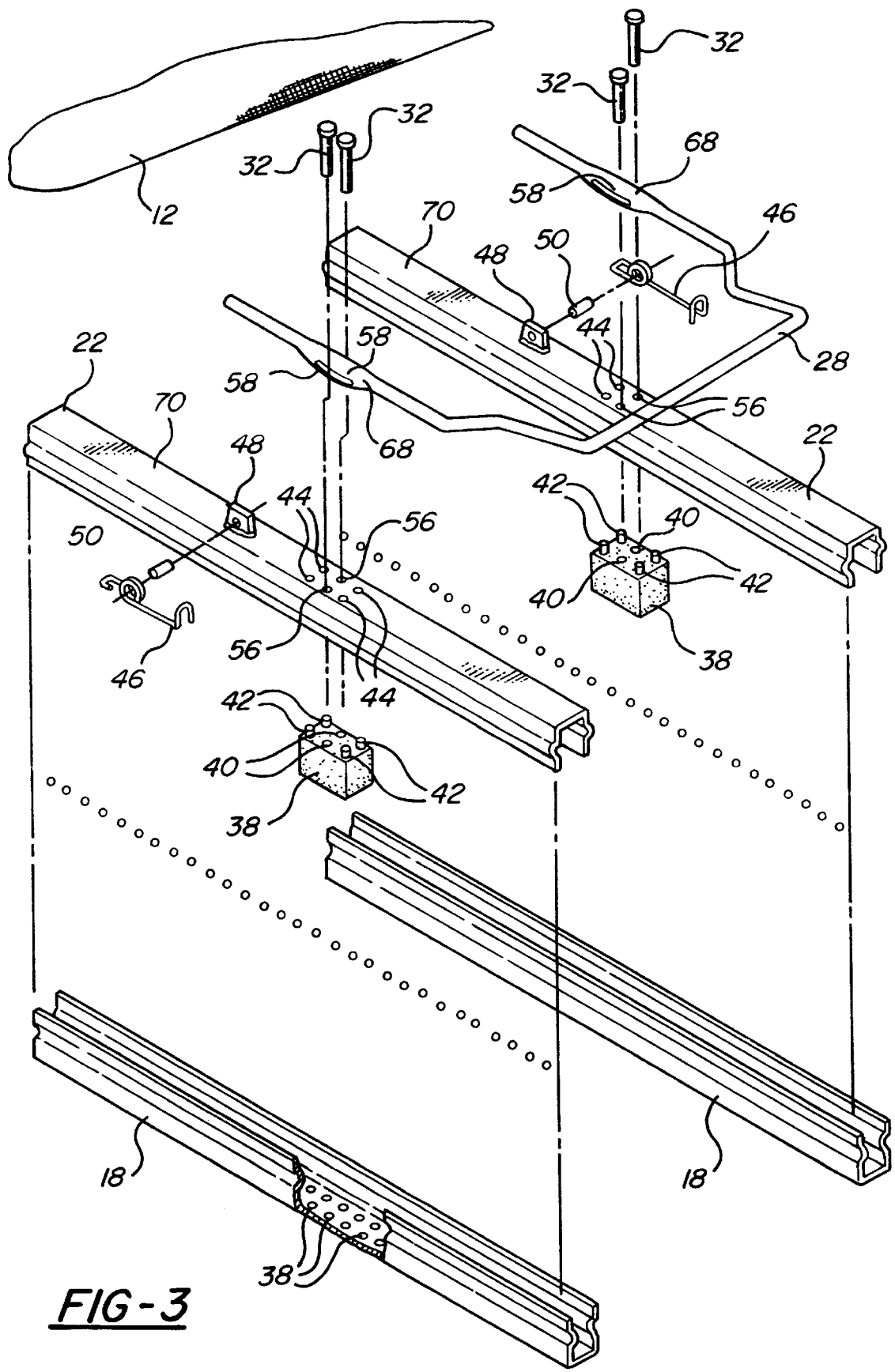
FIG. 3 is an exploded view of the seat track assembly shown in FIG. 2.

The locking assembly 30, shown in more detail in FIG. 3, includes at least one lock member 32 supported by the second track 22 for movement therewith and a retainer 34 for retaining the lock member 32 in a locked position to prevent relative movement between the first 18 and second 22 tracks. The retainer 34 can be integrally formed in the first track 18 or can be a separate piece fixed to the first track 18.

The lock member 32 is moved from the locked position to an unlocked position when the lock member 32 is selectively disengaged from the retainer 34 by moving at least a portion of the lock member 30 in a direction transverse to the longitudinal axis 36.

A lock block 38 is fixed to the second track 22 and includes at least one aperture 40 for partially receiving the lock member 32 to maintain the lock member 32 in a substantially vertical position with respect to the first 18 and second 22 tracks. The lock block 38 includes a plurality of extensions 42 that are inserted into corresponding holes 44 in the second track 22. The extensions 42 are used to properly locate the lock block 38 into position on the second track 22 and are mushroomed at assembly to fasten the lock block 38 to the second track 22. The extensions 42 are mushroomed by an ultrasonic process or by a heating process as is well known in the art.

The mounting assembly 16 includes resilient spring member 46 that is used to return the actuator 28 to the unactuated position. The spring 46 is preferably mounted to a bracket 48 on a top surface of the second track 22 with a pivot pin 50. The spring 46 also biases the lock member 32 to be in the locked position.

The lock member 32 is preferably a lock pin, shown in greater detail in FIG. 4, having a head portion 52 with a first cross-sectional area and a body portion 54 with a second cross-sectional area that is less than the first cross-sectional area. The lock pin 32 is inserted through a hole 56 in the second track 22 such that the head portion 52 is located above the second track 22 and the body portion 54 extends downwardly into the lock block 38 located below the second track 22. In the preferred embodiment a pair of lock pins 32 are used in the inboard track assembly 24 and a pair of lock pins 32 are used in the outboard track assembly 26, however, a single lock pin 32 could be used or more than two lock pins 32 could be used.

As discussed above, the actuator 28 is movable between actuated and unactuated positions. The actuator 28 is used to move the lock pins 32 from the locked position to the unlocked position when the actuator 28 is moved from the unactuated position to the actuated position. The actuator 28 includes a shaft portion 68 that extends along a top surface 70 of the second track 22 between the head portions 52 of the lock pins 32, as shown more clearly in FIG. 3. The shaft 68 narrows in thickness near the lock pins 32 and includes flanges 58 for engaging the head portions 52 to move the lock pins 32 from the locked position to the unlocked position. The flange portions 58 engage the head portion 52 of the lock pin 32 on a lower face 60 resulting in the application of a substantially vertical force against the head portion 52 when the actuator is moved to the actuated position. The shaft 68 also includes upper flange portions that engage a top face of the lock pin 32 to assist in returning the lock pins to the locked position.

A side cross-sectional view of the inboard track assembly 24 in the locked position is shown in FIG. 5. The description of the inboard track assembly 24 also applies to the outboard track assembly 26. The retainer 34 is preferably integrally formed with the first track 18 and is comprised of a plurality of apertures 62 longitudinally spaced along the first track 18. The apertures 62 partially receive a distal end 66 of the body portion 54 of the lock pins 32 when the locking assembly 30 is in the locked position. When the distal ends 66 are inserted into the apertures 62, there can be no relative movement between the tracks 18, 22 along the longitudinal axis 36.

A side cross-sectional view of the inboard track assembly 24 in the unlocked position is shown in FIG. 6. The spring 46 has a predetermined spring force for resiliently biasing the lock pins 32 in the locked position. The lock pin 32 is moved from the locked position to an unlocked position when the actuator 28 applies a force to the lock pins 32 that exceeds the predetermined spring force causing the distal ends 66 of the lock pins 32 to become disengaged from the apertures 62 in the retainer 34. Thus, when the actuator 28 is vertically lifted to the actuated position, the flanges 58 react against the head portions 52 of the lock pins 32, causing the lock pins 32 to move transversely to the longitudinal axis 36. In other words, the actuator 28 pulls the lock pins 32 upwardly through the lock block 38 and away from the first 18 and second 22 tracks such that the distal ends 66 are disengaged from the apertures 62 to allow the second track 22 to move relative to the first track 18.

The subject locking assembly 30 does not require a steel on steel interface between the track members 18, 22 and the locking assembly 30 such that aluminum or other light weight track materials can be used while still meeting strength and fatigue requirements. The locking assembly 30 is also durable and is less complex than known locking assemblies so that assembly cost and overall assembly weight can be reduced.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A locking assembly comprising
a first member defining a longitudinal axis;
a second member supported for movement relative to said first member along said longitudinal axis;
at least one lock member supported by said second member for movement therewith, said lock member comprising a lock pin having a head portion with a first cross-sectional area and a body portion with a second cross-sectional area that is less than said first cross-sectional area;
an actuator movable between actuated and unactuated positions, said actuator for moving said lock pin from said locked position to said unlocked position when said actuator is moved from said unactuated position to said actuated position; and
a retainer fixed to said first member for retaining said lock member in a locked position to prevent relative movement between said first and second members wherein said lock member is moved from said locked position to an unlocked position when said lock member is selectively disengaged from said retainer by moving at least a portion of said lock member in a direction transverse to said longitudinal axis.

2. An assembly as recited in claim 1 wherein said actuator includes a flange portion for engaging said head portion on a lower face resulting in the application of a substantially vertical force against said head portion when said actuator is moved to said actuated position.

3. An assembly as recited in claim 2 including a resilient spring member for returning said actuator to said unactuated position.

4. A vehicle seat assembly comprising
   a seat bottom;
   a seat back supported relative to said seat bottom;
   a first track defining a longitudinal axis;
   a second track supported for movement relative to said first track, said seat bottom being supported on said second track for movement with said second track along said longitudinal axis;
   an actuator for selectively controlling the movement of said second track with respect to said first track; and
   a locking assembly moveable between a locked position where said locking assembly prevents relative movement between said first and second tracks and an unlocked position where said second track is movable relative to said first track, said locking assembly including at least one lock member supported by said second track for movement therewith and a retainer fixed to said first track for receiving said lock member wherein said locking assembly is moved from said locked position to said unlocked position when said actuator moves at least a portion of said lock member vertically with respect to said first and second tracks causing said lock member to be disengaged from said retainer.

5. An assembly as recited in claim 4 including a resilient member for biasing said lock member in said locked position, said resilient member having a predetermined spring force wherein said lock member is moved from said locked position to said unlocked position when said actuator applies a force to said lock member that exceeds said predetermined spring force.

6. An assembly as recited in claim 4 wherein at least one lock member is a pair of lock pins having head portions located above said second track and body portions extending below said second track toward said first track.

7. An assembly as recited in claim 6 wherein said actuator is comprised of a shaft extending along a top surface of said second track between said head portions of said lock pins, said shaft having a flanges for engaging said head portions to move said lock pins from said locked position to said unlocked position.

8. An assembly as recited in claim 7 wherein said retainer is comprised of a plurality of longitudinally spaced pairs of apertures in the first track, said apertures for partially receiving said body portions of said lock pins when said locking assembly is in said locked position.

9. An assembly for mounting a seat within a vehicle comprising:
   a first track defining a longitudinal axis;
   a second track supported for movement relative to said first track;
   an actuator for selectively controlling the movement of said second track with respect to said first track; and
   a locking assembly moveable between a locked position where said locking assembly prevents relative movement between said first and second tracks and an unlocked position where said second track is movable relative to said first track, said locking assembly including at least one lock member supported by said second track for movement therewith, a resilient member having a predetermined spring force for resiliently biasing said lock member in said locked position, and a retainer fixed to said first track for receiving said lock member wherein said lock member is moved from said locked position to an unlocked position when said actuator applies a force to said lock member that exceeds said predetermined spring force causing said lock member to become disengaged from said retainer.

10. An assembly as recited in claim 9 wherein said actuator applies a substantially vertical force to said lock member causing at least a portion of said lock member to move in a direction transverse to said longitudinal axis.

11. An assembly as recited in claim 9 wherein said lock member is a lock pin fixed to said second track having a head portion above said second track and a body portion extending downwardly below said second track toward said first track.

12. An assembly as recited in claim 11 wherein said retainer is comprised of a plurality of apertures longitudinally spaced along said first track for partially receiving said body of said lock pin when said locking assembly is in said locked position.

13. An assembly as recited in claim 9 including a lock block fixed to said second track and having at least one aperture for partially receiving a body portion of said lock member to maintain said lock member in a substantially vertical position with respect to said first and second tracks.

14. An assembly as recited in claim 13 wherein at least one lock member is a plurality of lock pins, each extending downwardly from said second track through said lock block and having a distal end that extends beyond said lock block.

15. An assembly as recited in claim 14 wherein said retainer is comprised of a plurality of apertures longitudinally spaced along said first track for receiving said distal ends of said lock pins when said locking assembly is in said locked position.

\* \* \* \* \*